(12) United States Patent
Noon et al.

(10) Patent No.: US 10,235,780 B2
(45) Date of Patent: Mar. 19, 2019

(54) INTEGRATED DATA EXPLORATION, MODELING AND VISUALIZATION

(71) Applicant: Dropbox, Inc., San Francisco, CA (US)

(72) Inventors: Ryan Noon, Mountain View, CA (US); Christopher Park, San Jose, CA (US); Walter Kim, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 13 days.

(21) Appl. No.: 14/974,218

(22) Filed: Dec. 18, 2015

(65) Prior Publication Data

US 2017/0178368 A1    Jun. 22, 2017

(51) Int. Cl.
*G06F 17/30* (2006.01)
*G06T 11/20* (2006.01)

(52) U.S. Cl.
CPC ...... *G06T 11/206* (2013.01); *G06F 17/30516* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,847,785 A | * | 7/1989 | Stephens | G06F 3/04847 345/157 |
| 5,339,392 A | * | 8/1994 | Risberg | G06F 3/0481 715/255 |
| 5,414,809 A | * | 5/1995 | Hogan | G06F 3/0481 345/440 |
| 5,581,677 A | * | 12/1996 | Myers | G06T 11/206 345/440 |
| 5,594,899 A | * | 1/1997 | Knudsen | G06F 8/31 |
| 5,666,526 A | * | 9/1997 | Reiter | G06F 17/3041 |
| 6,243,711 B1 | | 6/2001 | Wu et al. | |
| 6,339,768 B1 | * | 1/2002 | Leung | G06F 17/30451 |
| 6,750,864 B1 | * | 6/2004 | Anwar | G06F 17/30489 345/440 |

(Continued)

OTHER PUBLICATIONS

Stolte et al., "Polaris: A System for Query, Analysis and Visualization of Multi-dimensional Relational Databases", dated 2002, 10 pages.

(Continued)

*Primary Examiner* — Motilewa Good Johnson
(74) *Attorney, Agent, or Firm* — Hickman Palermo Becker Bingham LLP

(57) ABSTRACT

Techniques are provided for data exploration. An application is provided for execution on a client computer to display a plurality of data fields associated with one or more data sources, receive user input specifying a set of one or more graph parameters based on one or more selected data fields, generate a graph model, and transmit a continuous query request corresponding to the graph model. In response to receiving the continuous query request from the application, a continuous query is generated and stored in association with the graph model. The continuous query is periodically executed to generate a plurality of computed result sets over time by accessing the one or more data sources. A selected computed result set is provided to the application. The application is configured to render a graph in the graph rendering interface based on the selected computed result set.

20 Claims, 8 Drawing Sheets

(56) References Cited

U.S. PATENT DOCUMENTS

| | | | |
|---|---|---|---|
| 7,177,798 B2 | 2/2007 | Hsu et al. | |
| 7,181,438 B1 | 2/2007 | Szabo | |
| 7,199,796 B2 * | 4/2007 | Bennett | H04L 43/045 345/440.1 |
| 7,716,173 B2 * | 5/2010 | Stolte | G06F 17/30592 707/600 |
| 7,844,586 B2 * | 11/2010 | von Duhn | G06Q 10/08 707/602 |
| 7,991,737 B2 * | 8/2011 | Nielsen | G06F 17/30306 707/613 |
| 8,108,375 B2 * | 1/2012 | Barsness | G06F 17/30457 707/705 |
| 8,306,835 B2 | 11/2012 | de Marcken et al. | |
| 8,510,657 B2 | 8/2013 | Gilbert et al. | |
| 9,092,162 B2 | 7/2015 | Wey et al. | |
| 9,098,106 B2 | 8/2015 | Danielsson et al. | |
| 9,244,802 B2 * | 1/2016 | Yalovsky | G06F 11/321 |
| 9,607,045 B2 * | 3/2017 | Fisher | G06F 17/30516 |
| 2004/0041838 A1 | 3/2004 | Adusumilli et al. | |
| 2005/0057566 A1 * | 3/2005 | Githens | G06F 19/321 345/440 |
| 2008/0195643 A1 * | 8/2008 | Sheth-Voss | G06F 17/3056 |
| 2012/0324507 A1 * | 12/2012 | Weber | H04H 20/38 725/37 |
| 2013/0124483 A1 | 5/2013 | Furuhashi et al. | |
| 2013/0187923 A1 * | 7/2013 | Yoshimoto | G06T 11/206 345/440 |
| 2013/0339219 A1 | 12/2013 | Bernheimer et al. | |
| 2014/0095483 A1 * | 4/2014 | Toillion | G06F 17/30442 707/722 |
| 2014/0176555 A1 * | 6/2014 | Kuo | G06T 11/206 345/440 |
| 2014/0188899 A1 * | 7/2014 | Whitnah | G06F 17/30646 707/749 |
| 2014/0365467 A1 * | 12/2014 | Dessau | G06F 17/30554 707/722 |
| 2015/0112998 A1 * | 4/2015 | Shankar | G06F 17/30312 707/741 |
| 2015/0379429 A1 * | 12/2015 | Lee | G09B 5/00 706/11 |
| 2015/0379430 A1 * | 12/2015 | Dirac | G06N 99/005 706/12 |
| 2016/0085810 A1 * | 3/2016 | de Castro Alves | G06F 17/30516 707/752 |
| 2016/0217384 A1 * | 7/2016 | Leonard | G06N 5/02 |
| 2016/0224804 A1 * | 8/2016 | Carasso | G06F 21/6254 |
| 2016/0239582 A1 * | 8/2016 | Schechter | G06F 17/30958 |
| 2017/0006135 A1 * | 1/2017 | Siebel | H04L 67/02 |

OTHER PUBLICATIONS

Ma, Jun, "Analysis and visualization of flow fields using information-theoretic techniques and graph-based representations", ProQuest Dissertations Publishing, dated 2014, 265 pages.

Badros et al., "The Cassowary Linear Arithmetic Constraint Solving Algorithm: Interface and Implementation", Technical Report UW-CSE-98-06-04, dated Jun. 29, 1998, 31 pages.

Badros et al., "Constraint Cascading Style Sheets for the Web", Technical Report UW CSE 99-05-01, dated Aug. 3, 1999, 10 pages.

* cited by examiner

INTEGRATED DATA EXPLORATION, MODELING AND VISUALIZATION

TECHNICAL FIELD

The present application relates to data exploration. More specifically, the example embodiment(s) described herein relate to integrated data exploration, modeling and visualization techniques.

BACKGROUND

Modern computing systems generate a large quantity of data. The amount of data generated by a typical system requires analysis and/or additional processing in order for users to make sense of and interpret the data. For example, visualizations may be generated on a large set of data to make the data accessible to a user in an intuitive and/or summarized format.

At the same time, real-time data processing is desirable and increasingly expected. However, generating a visualization on a large set of data can be a time intensive process. This is particularly true when the format of the visualization is modified.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

System Overview

Figure 1:
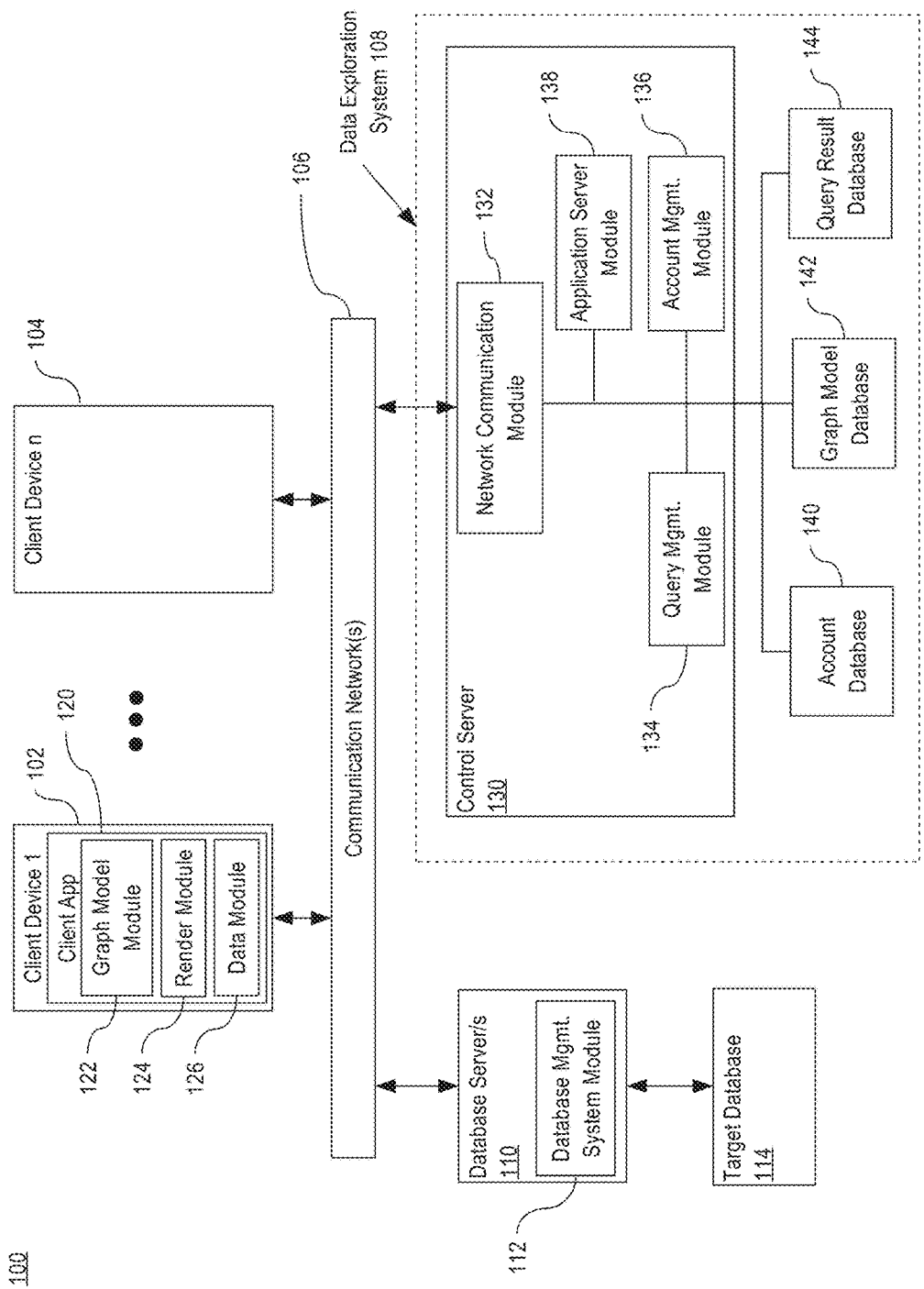
FIG. 1 is a block diagram illustrating an example of a distributed computing environment in accordance with one or more embodiments described herein.

FIG. 1 is a block diagram illustrating an example of a distributed computing environment in accordance with one or more embodiments described herein. A distributed computing environment may include a data exploration system that provides data exploration services to a plurality of users. An embodiment of a distributed computing environment is described hereafter.

The distributed computing environment 100 may include one or more client devices 102-104. The client devices 102-104 can be any of a number of computing devices usable to enable the activities described below, including interactions with the data exploration system 108. The client devices 102-104 may include, but are not limited to personal computers (PCs), internet kiosks, personal digital assistants, cellular telephones, smart phones, other cellular devices, gaming devices, desktop computers, laptop computers, tablet computers, other wireless devices, set-top devices, in-vehicle computers, other computing devices, and/or any combination thereof.

The client devices 102-104 are configured to execute a client application 120. As used herein, the term "application" refers generally to a unit of executable software instructions that implements a certain functionality or theme. The themes of an application vary broadly across any number of disciplines and functions (such as on-demand content management, e-commerce transactions, brokerage transactions, home entertainment, etc.), and one application may have more than one theme. The unit of executable software instructions generally runs in a predetermined environment. In one embodiment, the client application 120 includes a graph model module 122 that provides graph model creation and editing functionality, a render module 124 that provides graph rendering functionality, and a data module 126 that provides data access functionality. These modules and/or functions shall be described in greater detail hereafter.

The client devices 102-104 are configured to connect to a communications network 106. The communications network 106 may include one or more communications networks such as, but not limited to, local area networks, cellular networks, wireless networks, an intranet, the Internet, and/or any other communications link over which data may be transferred. The communications network 106 connects the client devices 102-104 to a data exploration system 108.

The data exploration system 108 supports data exploration on the client devices 102-104. For example, the data exploration system 108 may provide one or more services such as account management, graph model creation, graph model modification, graph model storage, and data retrieval functionality, including continuous query management. In some embodiments, the data exploration system 108 provides data exploration services over one or more public networks, such as the Internet, and/or one or more local area networks (LAN) or other private networks. In some embodiments, the data exploration system 108 is a cloud-based system.

The data exploration system 108 may communicate with a client application 120 executing on a client device 102, such as a desktop application, a mobile application, a web application, or through an application program interface (API). A user may log into an associated account from a client device 102 to access data and/or features of the data exploration system 108 for which the user has permissions. In some embodiments, a particular user may register to use one device or multiple devices with the data exploration system 108. Alternatively and/or in addition, a particular user may log into the data exploration system 108 from one device or from multiple devices.

The data exploration system 108 includes one or more control servers 130 connected to the communications network 106, a user account database 140, a graph model database 142, and a query result database 144. It should be appreciated that the configuration of components within the data exploration system 108 is merely an example configuration, and the components within the data exploration system 108 may be arranged in any suitable configuration.

As used herein, the term "server" refers to any computerized component, system or entity regardless of form which is adapted to provide data, applications, content, or other services to one or more other devices or entities on a computer network. In accordance with some embodiments, data exploration system 108 is implemented on one or more conventional computing devices, such as but not limited to a server computer, a network device, a laptop computer, a desktop computer, a workstation computer, a blade server, a mainframe computer, other types of computing device, or any combination thereof. In some embodiments, the data exploration system 108 includes multiple control servers 130, which may be located at the same location or at different geographic locations.

The control server 130 includes a network communications module 132, a query management module 134, an account management module 136, and an application server module 138, which are in communication with each other. The network communications module 132 connects the control server 130 to the communication network 106 and enables receipt of communications from the communication network 106 and the provision of communications to the communication network 106 bound for the client application 120 at a client device 102 or other destinations.

The application server module 138 is primarily responsible for interactions between the data exploration system 108 and the client application 120 executing on the client device 102. In some embodiments, the application server module 138 provides the client application 122 to the client device 102. For example, the application server module 138 may provide executable software instructions for an application, such as a mobile application, for execution on the client device 102. Alternatively and/or in addition, the application server module 138 may provide one or more web applications as content can be displayed and/or executed via a browser running on the client device 102. For example, at least one control server 130 or component thereof may be implemented as a Web server that receives network requests from the client application 120 and delivers network responses to the client application 120 via HTTP, HTTPS or a similar protocol.

The account management module 136 is primarily responsible for managing users of the data exploration system 108. In some embodiments, the account management module 136 receives new and/or modified graph models generated by a user and stores the graph models in association with the user. In some embodiments, the account information is stored in the account database 140, and the graph models are stored in the graph model database 142.

In some embodiments, the account management module 136 is primarily responsible for managing users of an encompassing system that includes the data exploration system 108 as a subsystem. An encompassing system is a system that generates data for which data exploration functionality is desired; non-limiting examples of encompassing systems are provided below. In this configuration, the data exploration system 108 is a subsystem of the encompassing system that provides data exploration services for the data generated or otherwise managed by the encompassing system. The data exploration services may be provided to users of the specific encompassing system, a subset of the users of the encompassing system, and/or a different set of users. Alternatively and/or in addition, the data exploration system 108 may be deployed as an independent system rather than a subsystem of one or more encompassing systems that it services.

One example of an encompassing system is a content management system. The content management system generates data describing usage and access by users of the content management system. In some embodiments, the data exploration system 108 is a subsystem that provides data exploration services on the data describing the content access activity of the content management system users. The data exploration services may be provided to the content management system users, a subset of the content management system users such as users with administrative rights, or a different set of users such as those involved in managing the content management system. The account management module 136 may manage accounts for the content management system users, accounts for the data exploration system 108, or any combination thereof.

Another example of an encompassing system is a customer relationship management (CRM) system. The CRM system generates and maintains CRM data for one or more customers. In some embodiments, the data exploration system 108 is a subsystem that provides data exploration services on the CRM data, and the data exploration services may be provided to the customers, a subset of the customers, or a different set of users. The account management module 136 may manage accounts for the CRM system customers, accounts for the data exploration system 108, or any combination thereof.

The query management module 134 is primarily responsible for obtaining targeted data corresponding to a graph model, such as a graph model created and/or edited in the client application 120 or a graph model stored in the graph model database 142. Graph models shall be described in greater detail hereafter.

The query management module 134 is configured to manage one or more continuous queries that are associated with one or more graph models. For example, the query management module 134 maintains and periodically executes one or more continuous queries. Continuous queries shall be described in greater detail hereafter. The query management module 134 may store one or more computed result sets from the periodic execution of the continuous queries to provide to one or more client applications 120 at a later time. The computed result sets may be stored in the query result database 144. In some embodiments, the query management module 134 may also manage queries other than continuous queries, which shall be described in greater detail hereafter.

The account database 126 stores information about accounts that are created and/or managed by the data exploration system 108. When the data exploration system 108 is a subsystem of an encompassing system that generates data, the account database 126 may store information about one or more accounts for users of the encompassing system, which may be the same set of users as the set of users of the data exploration system 108, a subset thereof, a superset thereof, or a different set of users. Alternatively and/or in addition, one or more other account databases may store information about one or more accounts for users of the encompassing system.

The graph model database 142 stores information about graph models, including graph models that are stored in association with one or more user accounts. For example, the graph model database 142 may store a graph model created and/or edited by a user in a client application 120. In some embodiments, the graph model database 142 stores graph models that are explicitly saved by a user for later access.

The query result database 144 stores information obtained for one or more queries corresponding to one or more graph models, such as one or more continuous queries that are periodically executed by the control server 130. For example, query management module 134 may periodically execute one or more continuous queries and store the computed result set in the query result database 144. In some embodiments, the query result database 144 stores a plurality of results sets for a particular continuous query. Alternatively and/or in addition, the query result database 144 may store a most recent computed result set for one or more continuous queries. Continuous queries shall be described in greater detail hereafter.

The data exploration system 108 supports data exploration with respect to one or more data sources. In one embodiment, the query management module 134 is configured to support a plurality of data source types, and the client application 120 may request data exploration services to be performed with respect to a user-specified data source that is supported. As used herein, the term "data source" refers to any medium that stores a set of data and/or any software or hardware configured to maintain the set of data. The data sources may include one or more database servers 110, one or more database management system modules 112, and/or one or more target databases 114. For example, a database server 110 may execute a database management system module 112 that manages a target database 114.

A database comprises database data and a database dictionary that are stored on a persistent memory mechanism, such as a set of hard disks. In a database, the data may be stored in one or more data containers that include a set of records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In some embodiments, the data exploration system 108 interacts with a database server 110 by submitting commands to the database server 110 over a communication network 106. The commands cause the database server 110 to perform operations on data stored in the target database 114. In some embodiments, the query management module 134 accesses one or more target databases 114 by transmitting a query to the database management system module 112 of one or more database servers 110 over one or more communication networks 106.

In FIG. 1, one or more database servers 110 are shown that are external to the data exploration system 108. Such external database servers 110 may be managed by the same entity and/or a related entity to the manager of the data exploration system 108, or may be managed by a third party that is unrelated to a manager of the data exploration system 108.

Alternatively and/or in addition, one or more database servers and/or data sources may be within data exploration system 108 or an encompassing system thereof. For example, the one or more control servers 130 may include one or more database management system module/s 112 and/or database server/s 110. In some embodiments, separate database server computers within the data exploration system 108 (or an encompassing system) provide access to one or more data sources and are located within the same private communication network as the control server/s 130, such as a local area network.

In some embodiments, the data exploration system 108 is configured to standardize one or more data types that may be represented differently in different databases. For example, time data may be represented as seconds, milliseconds, multiple field values (e.g. month, day, year, hour, minute, second, etc.) and/or a formatted string. Such standardization may include converting one or more fields, collapsing related fields into a single field, or any other method to standardize data across different data sources. In some embodiments, such standardization may include accessing data sources with overlapping or duplicative data, such as to integrate data from different data sources, reconcile data from different data sources, access a redundant data source when a primary data source is unavailable, or for other reasons.

In some embodiments, fewer and/or additional modules, functions, or databases are included in data exploration system 108. The modules shown in FIG. 1 as being part of data exploration system 108 represent functions performed in an example embodiment.

Although FIG. 1 portrays discrete blocks, the figure is intended as a functional description of some embodiments rather than a structural description of the functional elements. One of ordinary skill in the art will recognize that an actual implementation might have the functional elements grouped or split among various components. Similarly, the databases described herein may be stored in one or more combined database, and/or one or more separated databases.

Moreover, one or more blocks in FIG. 1 may be implemented on one or more servers designed to provide the described functionality. Further, although the description herein refers to certain features implemented in the client devices 102-104 and certain features implemented in the data exploration system 108, the embodiments of the invention are not limited to such distinctions. For example, features described herein as being part of the data exploration system 108 could be implemented in whole or in part in a client device 102-104, and vice versa.

Client Application

Figure 2:
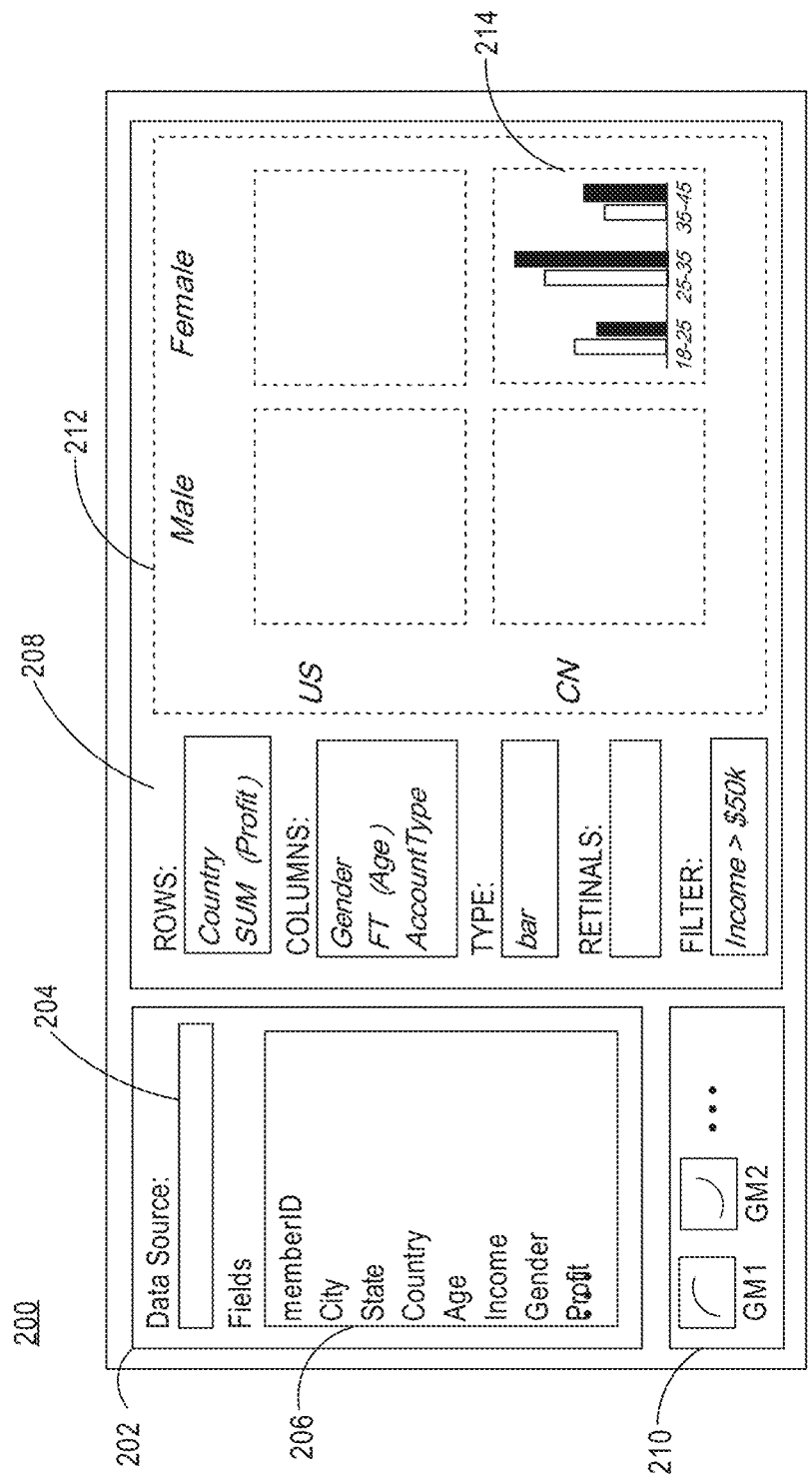
FIG. 2 illustrates an example graphical user interface in accordance with one or more embodiments.

FIG. 2 illustrates an example graphical user interface in accordance with one or more embodiments. The client application 120, when executed on a client device 102, may cause a graphical user interface 200 to be displayed on the client device 102. In some embodiments, the graphical user interface 200 includes a graph editing interface 202, a graph model selection interface 210 and/or a graph rendering interface 212, or any combination thereof. In some embodiments, different client applications may implement different combinations of these interfaces. Alternatively and/or in addition, a client application 120 may selectively display one or more of these interfaces at different times.

Graph Editing Interface

The graph editing interface 202 provides a mechanism for a user to create and/or modify a graph model. In some embodiments, the graph model module 122 of the client application 120 implements the graph editing interface 202 by causing the display of the graph editing interface 202 and processing user input entered in the graph editing interface 202.

As used herein, the term "graph model" refers to a data structure that defines a layout for visually representing a data set of a predefined format from a specified source. In some embodiments, the graph model is associated with specified field/s of one or more data sources. For example, the graph model may be associated with a set of columns in a particular table or a set of object types in an object-oriented database. Thus, the particular data set includes the values in the specified field/s for records in the data source.

Although a graph model is associated with the specified field/s, the graph model is independent of the actual data in the data source/s. That is, the layout for visually representing the data may be applied to any set of records in the data source. For example, when a graph model is associated with a particular set of columns of a particular table, the graph model can be used to render a visual representation of the table at a first time. If the data in the table changes, the same graph model can still be used to render a visual representation of the table at a second time. In this case, the visual representation would reflect the changes, even if the graph model were not modified.

The graph editing interface 202 may include a data source component 204 for specifying one or more data sources. For example, the data source component 204 may be used to select a target database 114, database system module 112, and/or a database server 110. In some embodiments, the data source/s specified are one or more containers of data stored in the target database 114. For example, one or more tables of a particular database may be specified. In some embodiments, the data source component 204 includes components that allows the user to provide authentication information that allows the user to access the target database 114.

The graph editing interface 202 may include a field display component 206 for displaying one or more fields of the corresponding data source/s. The control server 130 may provide information about the data source/s specified in the data source component 204, including the one or more fields of the selected data source/s. For example, after the one or more data sources are specified in the data source component 204, the client application 120 may send a request to the control server 130 to obtain a set of one or more fields that are present in the specified data source/s. In some embodiments, one or more fields that are displayed in the field display component 206 are used to generate one or more graph parameters, which shall be described in greater detail hereafter.

The graph model may be generated, used and/or stored at the client application 120, at the data exploration system 108, or any combination thereof. In some embodiments, the data exploration system 108 assigns a unique identifier to each graph model.

Graph Parameters

A graph model includes a set of graph parameters. The graph parameters each define a particular visual characteristic of the layout for visually representing data. A graph parameter of a graph model will modify how a corresponding graph is rendered.

The graph editing interface 202 may include a graph parameter component 208 for specifying one or more graph parameters of the graph model. The graph parameter component 208 allows a user to dynamically modify a graph model by adding, removing or modifying one or more graph parameters. The graph parameter component 208 may include one or more selection components, such as radio buttons, drop-down menus, scrolling components, and the like. In some embodiments, the graph parameter component 208 allows a user to create a graph parameter based on one or more fields in the field display component 206. For example, the graph editing interface 202 may include drag-and-drop functionality to select fields from the field display component 206 by dragging the fields into the graph parameter component 208.

In one embodiment, fields are treated as either categorical fields or quantitative fields when generating a graph model. A categorical field includes distinct values, such as 'Country', while a quantitative field includes numerical values over a domain, such as 'Profit.' In some embodiments, a quantitative field can be transformed to a categorical field using a field transform. For example, a field transform 'FT( )' may be applied to the quantitative field 'Age'. In this case, 'FT(Age)' converts age into categorical buckets: 18-25, 25-35 and 35-45. The graph editing interface 202 may further include components for specifying one or more field transforms (not shown), including the numerical range of the corresponding domain that corresponds to each categorical bucket.

In some embodiments, default field transforms are applied to specified fields in one or more specified data sources. For example, a data source may provide a mechanism that triggers a specific default field transform to be performed when a particular field is used in a graph model. One example of such a mechanism is a naming convention; if a particular field includes a particular string that is associated with a particular field transform, the particular field transform is applied to the particular field when generating a graph model. For example, the naming convention may include a rule that a suffix in the field name "_id" indicates that the field represents an identifier. The suffix "id" may be associated with a "COUNT_DISTINCT( )" field transform since this is the typical transform desired for identifiers, as opposed to an average, sum, or other transform. Thus, when a field "user_id" is selected when generating a graph model, the field transform COUNT_DISTINCT(user_id) is applied by default. Any type of mechanism may be used to specify one or more rules that indicate any desired default transform should be applied to any desired field.

In some embodiments, graph parameters may be created based on an aggregate function performed on a quantitative field. For example, a graph parameter may be based on the aggregate function 'SUM( )' of the field 'Profit'. Potential aggregate functions include average( ), sum( ), count( ), minimum( ), maximum( ), and other aggregate functions, which may include distinct aggregate functions. Thus, any graph parameter that can be created based on a field can also be created based on an aggregate function performed on the field when the field is a quantitative field.

The graph parameters of the graph model may include one or more Row parameters and/or one or more Column parameters. A Row parameter corresponds to the X axis in a graph, while the Column parameter corresponds to the Y axis in the graph. When more than one Row parameter and/or Column parameter is specified, the data can be grouped and presented in multiple graph panel components 214, which shall be described in greater detail hereafter.

The graph parameters of the graph model may also include one or more Type parameters. The type parameter specifies a graph type for the graph model. For example, when the type 'bar' is specified as a Type parameter, the graph model will include one or more graph bar components. Other Type parameters may be implemented, including but not limited to bar, line, bubble, pie, map, histogram, spatial, chloropleth, and other graph types.

The graph parameters of the graph model may also include one or more Retinal parameters. A Retinal parameter refers to a non-positional visual property of a graph element. Retinal parameters increase information density by encoding additional values in the rendering of a graph indicated by a Type parameter. Examples of non-positional visual properties of a graph element include, but are not limited to color, size, label, angle, shape, tooltips, other text, width, height, opacity, three-dimensional properties, and other visual properties. In some embodiments, different graph types can each support a different set of Retinal parameters, and the implementation of a particular Retinal parameter may be different for each graph type. A Retinal parameter may represent data values for a particular field. For example, a Retinal parameter may specify that the color of a bar element representing data in a first field (e.g. SUM(Profit)) is based on data in a second field (e.g. Average(Age)).

The graph parameters of the graph model may also include one or more Filter parameters. A Filter parameter specifies that certain data records may be excluded from the data used to render the graph corresponding to the graph model. For example, a Filter parameter may specify that a graph should be rendered based only on records corresponding to a particular AccountType (e.g. AccountType="paid"). In this case, the graph that is rendered will only include records in the data source that match the filter specified in the Filter parameter.

In some embodiments, the graph editing interface 202 allows a user to dynamically modify a current graph model for which a graph is currently rendered in the graph rendering interface 212. When a user changes the graph parameters for a graph model, such as by using the graph editing interface 202, the graph model is modified along with any continuous query stored in association with the graph model. Thus, the rendered graph is updated because the graph model and subsequent computed results sets obtained will be updated.

Graph Model Selection Interface

The graphical user interface 200 may include a graph model selection interface 210. In some embodiments, a user may work with multiple graph models. For example, a user may store, retrieve, edit, or share a particular graph model. The graph model selection interface 210 provides a mechanism for a user to select a graph model that is available to the user. A graph corresponding to a selected graph model may be rendered in the graph rendering interface 212. In some embodiments, a user may edit the selected graph model if the user has edit permissions for the selected graph model. In some embodiments, a graph corresponding to a current graph model may be rendered in the graph rendering interface 212 while the user is editing the current graph model.

In some embodiments, the client application 120 requests a set of graph models available to a particular user of the client device 102. The client application 120 then causes the set of graph models to be displayed in the graph model selection interface 210. In some embodiments, the graph model module 122 of the client application 120 implements the graph model selection interface 210 by causing the display of the graph model selection interface 210, and processing user input entered in the graph model selection interface 210.

Graph Rendering Interface

The graphical user interface 200 includes a graph rendering interface 212. The client application 120 causes a graph to be rendered in the graph rendering interface 212 based on a current graph model. In some embodiments, the render module 124 of the client application 120 implements the graph rendering interface 212 by causing the display of the graph rendering interface 212, including a graph that is rendered based on a particular graph model. For example, the render module 124 of the client application 120 may cause the display of a graph rendered based on a currently selected graph model selected by a user in the graph model selection interface 210.

As described above, when a particular field is represented in the graph model as a Row parameter and/or a Column parameter, the underlying data may be grouped by the particular field. When multiple fields are selected, additional graph panel components may be rendered. For example, in FIG. 2, multiple Row parameters ('Country', 'SUM(Profit)') and multiple Column parameters ('Gender', 'FT(Age)', 'AccountType') are selected. In the graph rendering interface 212, a graph panel component 214 is rendered for each combination of 'Gender' value and 'Country' value. For example, graph panel component 214 corresponds to data for data records where 'Gender'='female' and 'Country'='CN'. That is, the data may be separately aggregated for each combination indicated by the parameters, and a separate graph panel component 214 may be rendered for each subset of data.

Additionally, within each graph panel component 214, the columns drawn are grouped by 'FT(Age)', or a field transform of the age that transforms the age from a quantitative field to a categorical field (e.g. buckets 18-25, 25-35 and 35-45). Furthermore, within each graph panel component 214, the bars drawn are grouped by 'AccountType'. As shown, the data includes two values for account type, which are indicated by the light bars and the dark bars. Each bar represents the 'SUM(Profit)' for a subset of the records that are grouped by 'Country', 'Gender', 'FT(Age)' and 'AccountType'.

In order for a graph to be rendered, the underlying data corresponding to the graph model must be obtained, such as by the data module 126 of the client application 120. In some embodiments, the client application 120 renders a graph based on the data compiled by the query management module 134 of the control server 130. More specifically, for a particular graph model, the query management module 134 manages a particular continuous query and generates one or more results sets for the particular continuous query.

In some embodiments, the render module 124 dynamically updates the graph for a current graph model that is rendered in the graph rendering interface 212. For example, the graph may be dynamically updated when a new computed result set is obtained and/or when the graph model is modified. In some embodiments, the granularity of the dynamic update is partial. That is, only a subset of the graph components may be updated. For example, if it is determined that the underlying data at the data source has only changed for Females in CN of the age category 25-35, only the corresponding bars need to be updated.

Computed Result Sets

The client application 120 renders a graph corresponding to a graph model based on a computed result set. The control server 130 generates and provides the computed result set to the client application 120. A computed result set is generated based on query results for a query associated with the graph model, such as query results for a continuous query. In some embodiments, the computed result set is a data structure that includes one or more values for specific graph elements described in the graph model, where the values are determined based on the query results from the data source/s. In some embodiments, the continuous query and the graph model are structured such that the query result of the continuous query is the equivalent to the computed result set required by the graph model. Alternatively and/or in addition, the control server 130 may perform additional computations on the query results to generate the computed result set.

In some embodiments, the query management module 134 periodically executes a continuous query associated with a particular graph model. The continuous query is configured to obtain the relevant data corresponding to the graph model from the specified data source/s. In some embodiments, the query management module 134 stores the computed result set in the query result database 144. In some embodiments, the query result database 144 stores a plurality of computed results sets for a particular continuous query. Continuous queries shall be described in greater detail hereafter. Alternatively and/or in addition, the control server 130 may provide one or more computed result sets corresponding to a particular graph model for other query types. For example, a client application 120 may submit a query request corresponding to an immediate query, which shall be described in greater detail hereafter.

In some embodiments, the computed result sets may include one or more incremental computed result sets. An incremental computed result set includes data describing only the differences in the computed result set with respect to a prior computed result set for the same continuous query. Thus, if the computed result set for a particular time is an incremental computed result set, the full computed result set may be constructed using the incremental computed result set and one or more prior computed result sets, which may include one or more prior incremental computed result sets. An incremental computed result set for a continuous query executed at a particular time may include data describing the changes to the query result in the data source/s since a prior computed result set for the continuous query executed at a prior time. The prior time may be the time that the query was most recently executed before the particular time, or may be the time of an earlier execution.

In some embodiments, an incremental computed result set is computed over only a subset of data records that have changed since the prior incremental computed result set was generated. For example, in OLTP workloads and for other data where records are not generally changed after they are created, an incremental computed result set may be computed over records corresponding to the time increment since the last incremental computed result set was computed.

Continuous Queries

As used herein, the term "continuous query" refers to a query that is periodically executed a plurality of times. The control server 130 tracks a plurality of continuous queries for a plurality of graph models, and manages the computed result sets for the plurality of continuous queries. For example, a query management module 134 of the control server 130 may periodically execute one or more continuous queries and store the computed result sets for future retrieval. In some embodiments, the query management module 134 periodically executes the continuous queries asynchronously with respect to the continuous query request received from the corresponding client applications 120. That is, the continuous queries are executed in a non-blocking manner.

In some embodiments, the data module 126 of the client application 120 handles requests for data by causing a query to be generated. For example, in response to user input in the graph editing interface 202, such as user input that creates, deletes and/or modifies one or more graph parameters, the data module 126 may transmit a continuous query request to create and/or update a continuous query corresponding to the graph model. In some embodiments, the client application 120 provides the graph parameters to the control server 130, which generates and stores the graph model the graph model database 142, and which also causes the corresponding continuous query to be generated.

The query management module 134 may control the periodic execution of each continuous query based on one or more factors, such as but not limited to a user-specified priority of the continuous query and/or the associated graph model, an automatically computed priority of the continuous query and/or the graph model, a number of users associated with the corresponding graph model, a user-specified duration or other time parameter, an automatically computed user-specified duration or other time parameter, a number of active users currently viewing or otherwise accessing the graph model, an availability of computing resources, and/or any other factor. In some embodiments, the periodic execution of one or more continuous queries is based on one or more scheduling factors corresponding to the data source. For example, if a particular database is updated on a particular schedule, one or more continuous queries that require access to the particular database may be periodically executed based on the particular schedule.

In some embodiments, one or more continuous queries are periodically executed even when no client application 120 is currently viewing or otherwise accessing the corresponding graph model. For example, a user may generate a graph model with a corresponding continuous query that is expected to have high latency. The user may later access the graph model to check for the results of the continuous query.

In some embodiments, the control server 130 stores one or more computed result sets in a query result database 144. The control server 130 provides the corresponding computed result set to a client application 120. In some embodiments, one or more computed result sets corresponding to a graph model are provided to a client application 120 on a short polling (i.e. pull) basis. In this case, the client application 120 periodically requests a computed result set, and the control server 130 provides the computed result set if the new computed result set is available. Alternatively and/or in addition, one or more computed result sets corresponding to the graph model may be provided to the client application 120 on a long polling basis (i.e. push). In this case, in the event that a new computed result set is obtained, the control server 130 provides the computed result set to the client application 120. In some embodiments, a query management module 134 of the control server 130 performs one or more of these functions.

In some embodiments, a query application programming interface (API) is provided that allows client applications 120 to access the continuous query management functionality of the control server 130. A query API may implement the following set of example functions and/or similar functions, a superset thereof or a subset thereof:

creating a continuous query;
deleting a continuous query;

modifying a continuous query;
retrieving a computed result set for a continuous query; and/or
other functions relating to a continuous query.

In some embodiments, the client application 120 is a web application that is executed in a browser window, such as a browser tab. Long polling may be implemented using an open TCP connection between the control server 130 and executing web application to receive push notifications from the control server 130. In some embodiments, at least one TCP connection is multiplexed to provide long pulling notifications from the control server 130 for multiple continuous queries. Alternatively and/or in addition, another event-driven architecture may be used.

Both continuous queries and immediate queries may be supported by the control server 130. In some embodiments, both continuous queries and immediate queries are implemented by calling the same function to generate a query request, and a continuous query request is indicated using a flag that indicates whether the query is the continuous query or an immediate query. An immediate query is performed in a blocking manner rather than a non-blocking manner. In some embodiments, a continuous query may include an immediate query option for the first computed result set. In this case, the first computed result set is computed and provided to the client application 120 in a blocking manner, while subsequent computed results sets are computed and provided to the client application 120 in a non-blocking manner.

Example Processes

Figure 3:
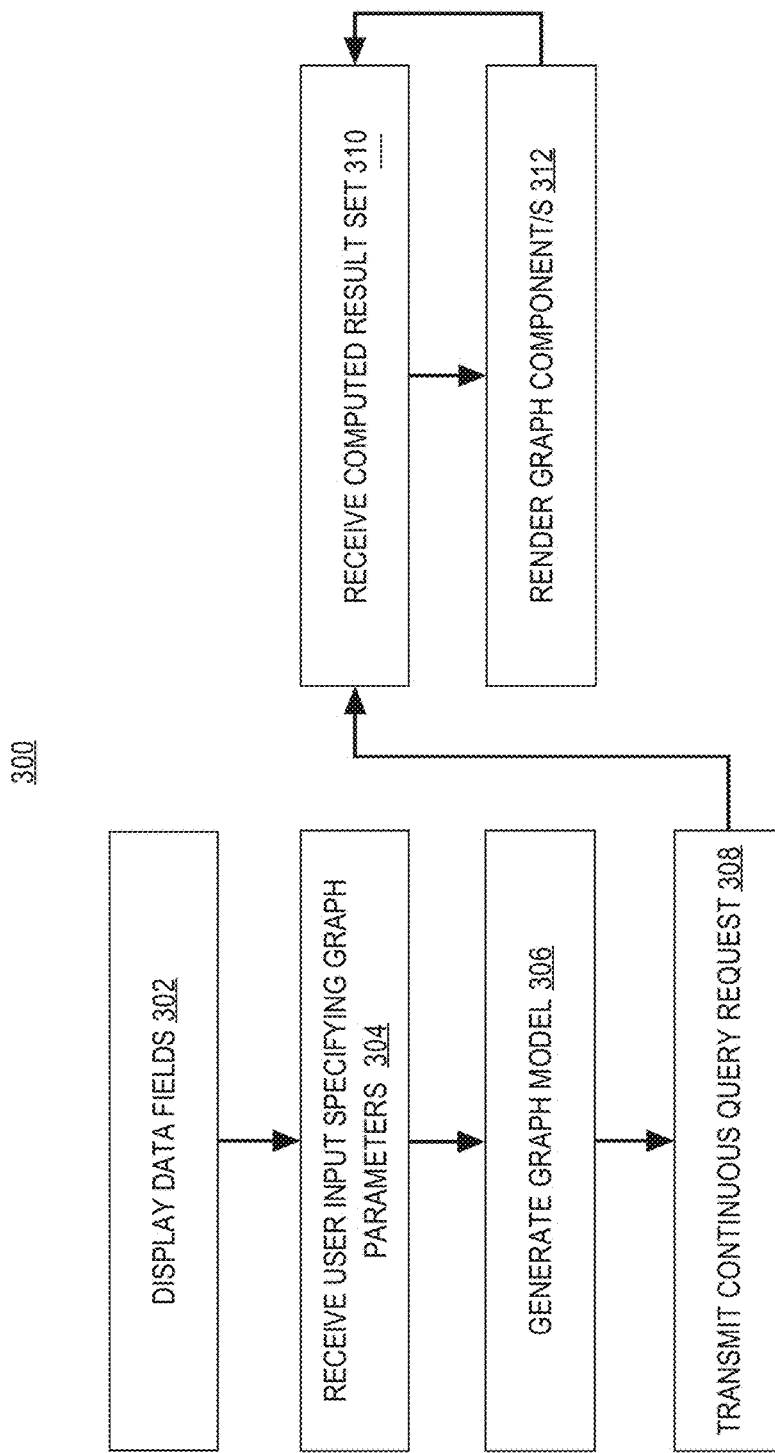
FIG. 3 is a flow diagram that depicts an example process for generating a graph model in accordance with one or more embodiments.

FIG. 3 is a flow diagram that depicts an example process for generating a graph model in accordance with one or more embodiments. Process 300 may be performed by one or more computing devices and/or processes thereof. For example, one or more blocks of process 300 may be performed by computing device 700. In some embodiments, one or more blocks of process 300 are performed by one or more client devices 102-104 executing a client application 120.

At block 302, a client computing device displays a plurality of data fields associated with one or more data sources. In one embodiment, a client application 120 executing on the client computing device causes the plurality of data fields to be displayed in a graph editing interface 202.

At block 304, the client computing device receives user input specifying a set of one or more graph parameters based on one or more selected data fields associated with the one or more data sources. In one embodiment, the set of one or more per graph parameters may include one or more Row parameter/s, Column parameter/s, Type parameter/s, Retinal parameter/s, and/or Filter parameter/s. The one or more graph parameters may be specified by the user in graph editing interface 202 implemented by the client application 120.

At block 306, the client computing device generates a graph model based on the set of one or more graph parameters that are specified. In one embodiment, the graph model is generated by a graph model module 122 of the client application 120.

At block 308, the client computing device transmits a continuous query request corresponding to the graph model. In one embodiment, a query request is transmitted to the data exploration system 108. For example, the query request may be transmitted from the client application 120 to the query management module 134 of a control server 130. In one embodiment, the query request is a continuous query request to be executed in a non-blocking manner.

At block 310, the client computing device receives a computed result set. In one embodiment, the computed result set is received from the data exploration system 108. For example, the computed result set may be received from the query management module 134 of a control server 130. In one embodiment, the data module 126 of the client application 120 receives the computed result set.

At block 312, the client computing device renders one or more graphs components based on the graph model and the computed result set. In one embodiment, the render module 124 of the client application 128 renders the one or more graph components.

In one embodiment, processing continues to step 310, repeating steps 310-312 until process 300 returns and/or terminates, such as by passing control to a calling process, generating any appropriate record or notification, returning after a method or function invocation, or terminating. For example, additional computed result sets may be received in response to a continuous query request, and one or more graph components may be rendered to update the graph.

Figure 4:
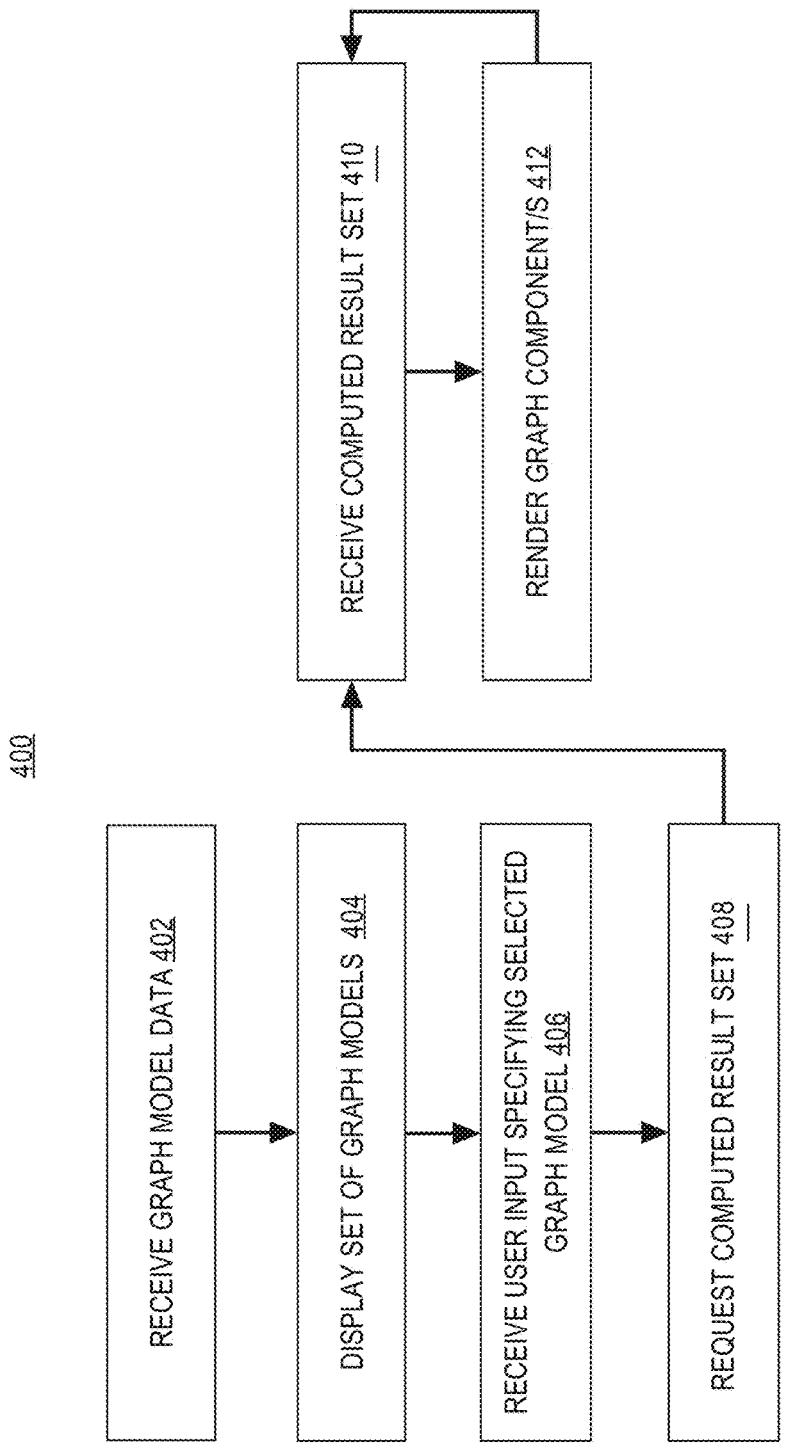
FIG. 4 is a flow diagram that depicts an example process for using an existing graph model in accordance with one or more embodiments.

FIG. 4 is a flow diagram that depicts an example process for using an existing graph model in accordance with one or more embodiments. Process 400 may be performed by one or more computing devices and/or processes thereof. For example, one or more blocks of process 400 may be performed by computing device 700. In some embodiments, one or more blocks of process 400 are performed by one or more client devices 102-104 executing a client application 120.

At block 402, a client computing device receives graph model data corresponding to a set of one or more graph models that are available to a particular user. For example, the set of available graph models may include graph models previously saved by the particular user, graph models shared with the particular user by other users, or other graph models that are otherwise available to the user.

At block 404, the client computing device displays the set of graph models available to the particular user. For example, a client application 120 may cause the set of available graph models to be displayed in a graph model selection interface 210.

At block 406, the client computing device receives user input specifying a selected graph model from the set of graph models that are available to the particular user.

At block 408, the client computing device requests a computed result set corresponding to the selected graph model. In one embodiment, a plurality of computed results sets are stored in by the data exploration system 108 in association with a continuous query corresponding to the selected graph model. For example, the control server 130 may periodically execute a continuous query, thereby periodically generating an additional computed result set. The control server 130 may store the additional computed result set in the query result database 144.

At block 410, the client computing device receives a computed result set corresponding to the selected graph model.

At block 412, the client computing device renders one or more graphs components based on the graph model and the computed result set.

In one embodiment, processing continues to step 410, repeating steps 410-412 until process 400 returns and/or terminates, such as by passing control to a calling process, generating any appropriate record or notification, returning after a method or function invocation, or terminating. For example, additional computed result sets may be received in response to a continuous query request, and one or more graph components may be rendered to update the graph.

Figure 5:
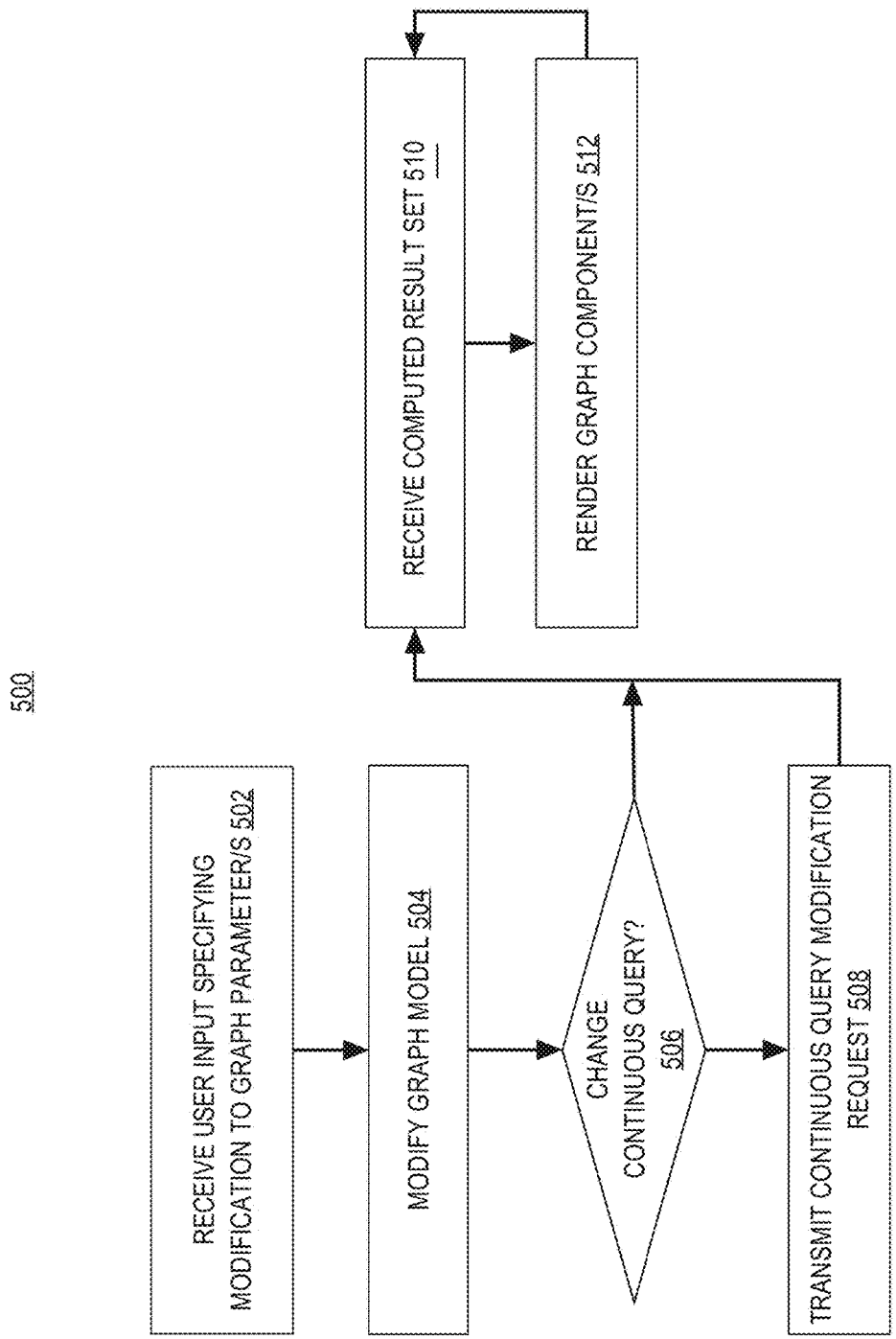
FIG. 5 is a flow diagram that depicts an example process for modifying a graph model in accordance with one or more embodiments.

FIG. 5 is a flow diagram that depicts an example process for modifying a graph model in accordance with one or more embodiments. Process 500 may be performed by one or more computing devices and/or processes thereof. For example, one or more blocks of process 500 may be performed by computing device 700. In some embodiments, one or more blocks of process 500 are performed by one or more client devices 102-104 executing a client application 120.

At block 502, the client computing device receives user input specifying one or more modifications to one or more graph parameters of a graph model. In one embodiment, the user input specifying the one or more modifications is received in a graph editing interface 202.

At block 504, the client computing device modifies the current graph model.

At decision block 506, it is determined whether the modification requires a change to the continuous query stored in association with the current graph model. If it is determined that the modification requires a change to the continuous query, processing proceeds to block 508. Otherwise, processing proceeds to block 510.

At block 508, the client computing device to continuous query modification request indicating that the continuous query request stored in association with the graph model should be updated. For example, the continuous query modification request may include or define a new continuous query to associate with the graph model, or may include or define modifications to an existing continuous query that is currently associated with the graph model.

At block 510, the client computing device receives a computed result set corresponding to the modified graph model.

At block 512, the client computing device renders one or more graphs components based on the graph model and the computed result set.

In one embodiment, processing continues to step 510, repeating steps 510-512 until process 500 returns and/or terminates, such as by passing control to a calling process, generating any appropriate record or notification, returning after a method or function invocation, or terminating. For example, additional computed result sets may be received in response to a continuous query request, and one or more graph components may be rendered to update the graph.

Figure 6:
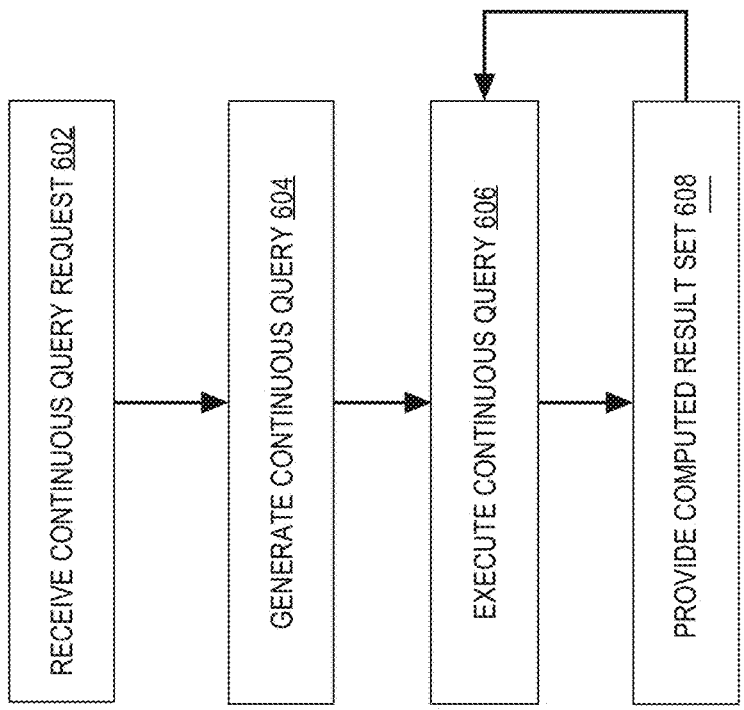
FIG. 6 is a flow diagram that depicts an example process for continuous query management in accordance with one or more embodiments.

FIG. 6 is a flow diagram that depicts an example process for continuous query management in accordance with one or more embodiments. Process 600 may be performed by one or more computing devices and/or processes thereof. For example, one or more blocks of process 600 may be performed by computing device 700. In some embodiments, one or more blocks of process 600 are performed by one or more server computing devices in a data exploration system 108, such as control server 130.

At block 602, the server computing device receives the continuous query request. In one embodiment, a control server 130 of the data exploration system receives the continuous query request from the client application 120. For example, a query management module 134 of the control server 130 may receive the continuous query request from a data module 126 of the client application 120.

At block 604, the server computing device generates a continuous query in response to receiving the continuous query request. In one embodiment, the continuous query is stored in association with a current graph model that is currently being accessed by a user on a client device.

At block 606, the server computing device executes the continuous query to generate a computed result set by accessing one or more data sources corresponding to the current graph model.

At block 608, the server computing device provides a computed result set to one or more client applications 120 executing on one or more client devices. The continuous query is executed in a non-blocking manner.

In one embodiment, processing continues between steps 606-608 until process 600 returns and/or terminates. For example, processing may continue to periodically execute the continuous query and provide one or more computed result sets, or until process 600 performs passing control to a calling process, generating any appropriate record or notification, returning after a method or function invocation, or terminating.

Example Computing Device

Figure 7:
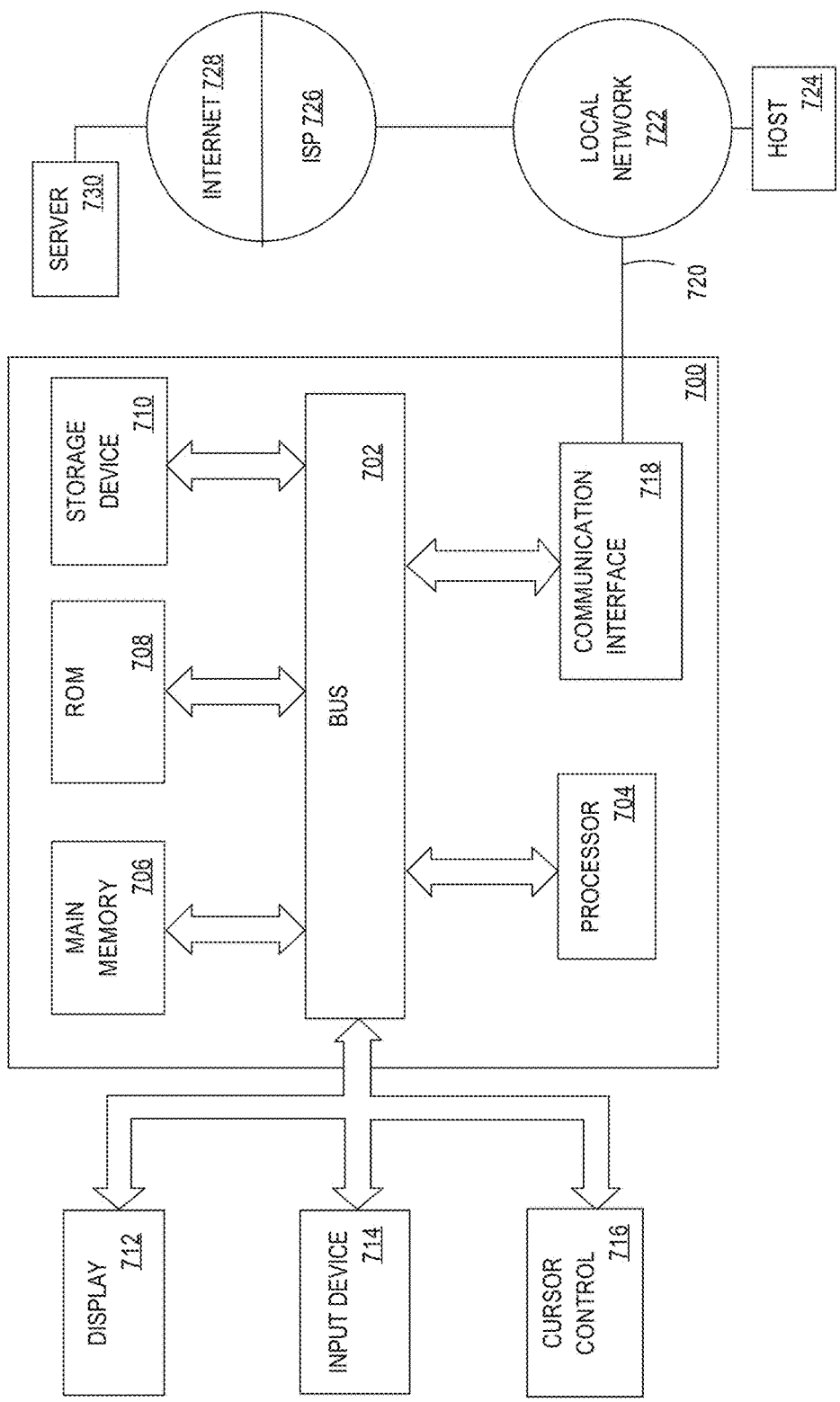
FIG. 7 is a block diagram of an example computing device on which one or more embodiments may be implemented.

FIG. 7 is a block diagram of an example computing device on which one or more embodiments may be implemented. Computing device 700 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor.

Main memory 706, such as a random access memory (RAM) or other dynamic storage device, also may be coupled to bus 702 for storing information and software instructions to be executed by processor(s) 704. Main memory 706 also may be used for storing temporary variables or other intermediate information during execution of software instructions to be executed by processor(s) 704.

Software instructions, when stored in computer-readable media accessible to processor(s) 704, render computing device 700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and software instructions for processor(s) 704.

One or more mass storage devices 710 may be coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such software instructions may be read into main memory 706 from another storage medium, such as storage device(s) 710. Execution of the software instructions contained in main memory 706 cause processor(s) 704 to perform the functions of the example embodiment(s).

While functions and operations of the example embodiment(s) may be implemented entirely with software instructions, hard-wired or programmable circuitry of computing device 700 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor(s) 704 for execution. For example, the software instructions may initially be carried on a magnetic disk or solid-state drive of a remote computer. The remote computer can load the software instructions into its dynamic memory and send the software instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the software instructions. The software instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

Example Software System

Figure 8:
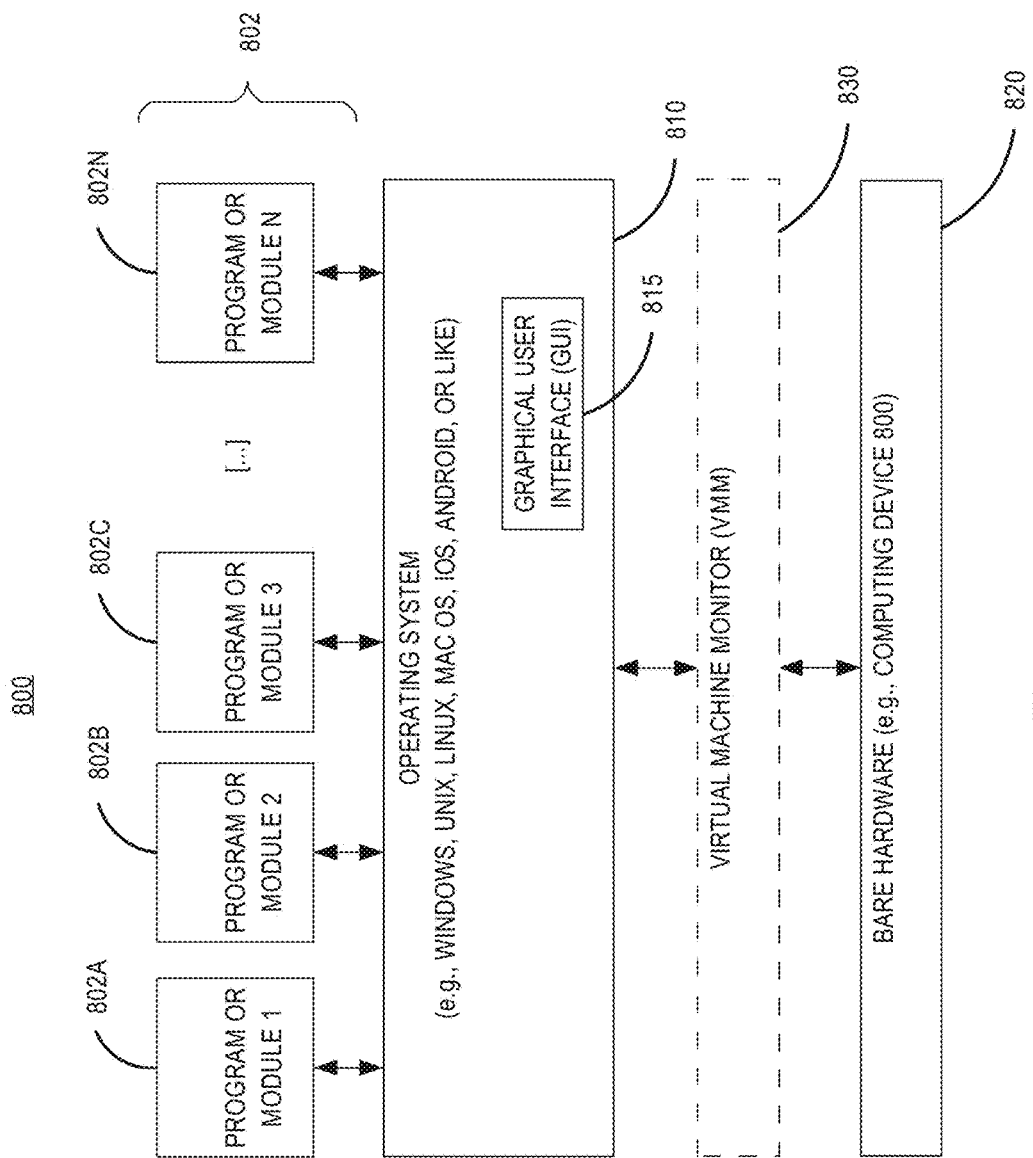
FIG. 8 is a block diagram of an example software system for controlling the operation of an example computing device on which one or more embodiments may be implemented.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810. The OS 810 manages low-level aspects of computer operation, including managing execution of processes, memory allocation, file input and output (I/O), and device I/O. One or more application programs, represented as 802A, 802B, 802C . . . 802N in FIG. 8, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A system, comprising:
one or more processors;
one or more computer-readable media storing one or more computer programs for execution by the one or more processors, the one or more computer programs comprising instructions for:
providing an application for execution on a client computer, wherein the application is configured to:
display, in a graph editing interface at the client computer, one or more data source components for entering input specifying one or more data sources based on which a graph model is to be generated, wherein the one or more data sources are database tables;
send, responsive to receiving input specifying the one or more data sources, a request to obtain a specification of a plurality of data object types associated with the one or more data sources specified;
receive, responsive to sending the request to obtain the specification of the plurality of data object types, the specification of a plurality of data object types associated with the one or more data sources specified, wherein the specification of the plurality of data object types comprise specification of a plurality of column names from the database tables specified;
display, responsive to receiving the specification of the plurality of data object types, the plurality of data object types specified;
receive, responsive to displaying the plurality of data object types specified, user input selecting a plurality of graph parameters, wherein the plurality of graph parameters selected are based on the plurality of data object types displayed;
generate and store, responsive to receiving user input selecting the plurality of graph parameters, a graph model based on the plurality of graph parameters;
transmit a continuous query request corresponding to the graph model;
in response to receiving the continuous query request from the application, generating a continuous query and storing the continuous query in association with the graph model;
periodically executing the continuous query to generate a plurality of computed result sets over time by accessing the one or more data sources;
providing a selected computed result set corresponding to the graph model, of the plurality of computed result sets, to the application, wherein the application is configured to render a graph in a graph rendering interface based on the graph model, the plurality of graph parameters, and the selected computed result set;

rendering the graph in the graph rendering interface based on the graph model, the plurality of graph parameters, and the selected computed result set;

wherein the plurality of graph parameters includes a plurality of row parameters and a plurality of column parameters;

wherein the plurality of row parameters includes a first row parameter and a second row parameter;

wherein the plurality of column parameters includes a first column parameter and a second column parameter;

wherein the first row parameter corresponds to a first set of values of the selected computed result set;

wherein the first column parameter corresponds to a second set of values of the selected computed result set;

wherein the first set of values correspond to a first data object type of the plurality of data object types;

wherein the second set of values correspond to a second data object type of the plurality of data object types;

wherein the graph rendered includes a plurality of graph panel components;

wherein each graph panel component of the plurality of graph panel components is labeled in the graph rendered by a corresponding pair of values of a plurality of pairs of values;

wherein each pair of values of the plurality of pairs of values is based on one value from the first set of values and one value from the second set of values; and wherein each graph panel component of the plurality of graph panel components contains a respective chart, the respective chart based at least in part on a respective set of values of the selected computed result set corresponding to the second row parameter and a respective set of values of the selected computed result set corresponding to the second column parameter, the respective set of values corresponding to the second row parameter and the respective set of values corresponding to the second column parameter being associated by the one or more data sources with the pair of values corresponding to the graph panel component.

2. The system of claim 1, wherein periodically executing the continuous query is performed asynchronously with respect to the application.

3. The system of claim 2, wherein providing the selected computed result set to the application is performed in response to completion of an execution of the continuous query that generates the selected computed result set.

4. The system of claim 2, wherein providing the selected computed result set to the application comprises providing a most recent computed result set, of the plurality of computed result sets, to the application in response to a request from the application.

5. The system of claim 1, wherein the one or more computer programs further comprise instructions for:

in response to receiving the continuous query request from the application, executing an immediate query and providing an initial result set to the application, wherein periodically executing the continuous query is performed after executing the immediate query.

6. The system of claim 1, wherein the one or more computer programs further comprise instructions for:

providing, to the application, data describing a set of graph models associated with a current user of the application, wherein the application is configured to display the set of graph models in a model selection interface; and periodically executing a set of continuous queries to generate corresponding computed result sets, wherein each continuous query of the set of continuous queries is stored in association with a graph model of a plurality of graph models.

7. The system of claim 6, wherein the application is configured to:

display, in the model selection interface, a representation of the set of graph models;

receive user input specifying a selected graph model;

request a particular computed result set stored in association with the selected graph model; and render a graph in the graph rendering interface based on the selected graph model and the particular computed result set.

8. The system of claim 1, wherein the application is configured to:

receive, in the graph editing interface, user input specifying a modification to the plurality of graph parameters;

determine that the modification requires a change to the continuous query; and transmit a continuous query modification request corresponding to the graph model based on the modification; and wherein the one or more computer programs further comprise instructions for:

in response to receiving the continuous query modification request, updating the continuous query stored for the graph model, wherein subsequent computed result sets generated by periodically executing the continuous query are based on an updated continuous query.

9. The system of claim 1, wherein the application is configured to:

receive, in the graph editing interface, user input specifying a modification to the plurality of graph parameters;

determine that the modification does not require a change to the continuous query;

update the graph model based on the modification; and update the graph in the graph rendering interface.

10. The system of claim 1, wherein at least one of the plurality of computed result sets is an incremental computed result set that includes data based on new records generated since computing a prior computed result set.

11. A method comprising:

at one or more computing devices comprising one or more processors and memory storing one or more computer programs executed by the one or more processors to perform the method, performing the operations of:

providing an application for execution on a client computer, wherein the application is configured to:

display, in a graph editing interface at the client computer, one or more data source components for entering input specifying one or more data sources based on which a graph model is to be generated, wherein the one or more data sources are database tables;

send, responsive to receiving input specifying the one or more data sources, a request to obtain a specification of a plurality of data object types associated with the one or more data sources specified;

receive, responsive to sending the request to obtain the specification of the plurality of data object types, a specification of a plurality of data object types associated with the one or more data sources specified, wherein the specification of the plurality of data object types comprise specification of a plurality of column names from the database tables specified;

display, responsive to receiving the specification of the plurality of data object types, the plurality of data object types specified;

receive, responsive to displaying the plurality of data object types specified, user input selecting a plurality of graph parameters, wherein the plurality of graph parameters selected are based on the plurality of data object types displayed;

generate and store, responsive to receiving user input selecting the plurality of graph parameters, a graph model based on the plurality of graph parameters;

transmit a continuous query request corresponding to the graph model;

in response to receiving the continuous query request from the application, generating a continuous query and storing the continuous query in association with the graph model;

periodically executing the continuous query to generate a plurality of computed result sets over time by accessing the one or more data sources;

providing a selected computed result set corresponding to the graph model, of the plurality of computed result sets, to the application, wherein the application is configured to render a graph in a graph rendering interface based on the graph model, the plurality of graph parameters, and the selected computed result set;

rendering the graph in the graph rendering interface based on the graph model, the plurality of graph parameters, and the selected computed result set;

wherein the plurality of graph parameters includes a plurality of row parameters and a plurality of column parameters;

wherein the plurality of row parameters includes a first row parameter and a second row parameter;

wherein the plurality of column parameters includes a first column parameter and a second column parameter;

wherein the first row parameter corresponds to a first set of values of the selected computed result set;

wherein the first column parameter corresponds to a second set of values of the selected computed result set;

wherein the first set of values correspond to a first data object type of the plurality of data object types;

wherein the second set of values correspond to a second data object type of the plurality of data object types;

wherein the graph rendered includes a plurality of graph panel components;

wherein each graph panel component of the plurality of graph panel components is labeled in the graph rendered by a corresponding pair of values of a plurality of pairs of values;

wherein each pair of values of the plurality of pairs of values is based on one value from the first set of values and one value from the second set of values corresponding to the first column parameter; and wherein each graph panel component of the plurality of graph panel components contains a respective chart, the respective chart based at least in part on a respective set of values of the selected computed result set corresponding to the second row parameter and a respective set of values of the selected computed result set corresponding to the second column parameter, the respective set of values corresponding to the second row parameter and the respective set of values corresponding to the second column parameter being associated by the one or more data sources with the pair of values corresponding to the graph panel component.

12. The method of claim 11, wherein periodically executing the continuous query is performed asynchronously with respect to the application.

13. The method of claim 12, wherein providing the selected computed result set to the application is performed in response to completion of an execution of the continuous query that generates the selected computed result set.

14. The method of claim 12, wherein providing the selected computed result set to the application comprises providing a most recent computed result set, of the plurality of computed result sets, to the application in response to a request from the application.

15. The method of claim 11, wherein the one or more computer programs further comprise instructions for:
in response to receiving the continuous query request from the application, executing an immediate query and providing an initial result set to the application,
wherein periodically executing the continuous query is performed after executing the immediate query.

16. The method of claim 11, wherein the one or more computer programs further comprise instructions for:
providing, to the application, data describing a set of graph models associated with a current user of the application, wherein the application is configured to display the set of graph models in a model selection interface; and
periodically executing a set of continuous queries to generate corresponding computed result sets, wherein each continuous query of the set of continuous queries is stored in association with a graph model of a plurality of graph models.

17. The method of claim 16, wherein the application is configured to:
display, in the model selection interface, a representation of the set of graph models;
receive user input specifying a selected graph model;
request a particular computed result set stored in association with the selected graph model; and
render a graph in the graph rendering interface based on the selected graph model and the particular computed result set.

18. The method of claim 11,
wherein the application is configured to:
receive, in the graph editing interface, user input specifying a modification to the plurality of graph parameters;
determine that the modification requires a change to the continuous query; and
transmit a continuous query modification request corresponding to the graph model based on the modification; and
wherein the one or more computer programs further comprise instructions for:
in response to receiving the continuous query modification request, updating the continuous query stored for the graph model, wherein subsequent computed result sets generated by periodically executing the continuous query are based on an updated continuous query.

19. The method of claim 11, wherein the application is configured to:
receive, in the graph editing interface, user input specifying a modification to the plurality of graph parameters;

determine that the modification does not require a change to the continuous query;
update the graph model based on the modification; and
update the graph in the graph rendering interface.

20. The method of claim 11, wherein at least one of the plurality of computed result sets is an incremental computed result set that includes data describing differences with respect to a prior computed result set.

* * * * *